(12) United States Patent
Hama et al.

(10) Patent No.: US 9,083,612 B2
(45) Date of Patent: Jul. 14, 2015

(54) COMMUNICATION SYSTEM, CONTROL APPARATUS, COMMUNICATION METHOD, AND PROGRAM

(75) Inventors: Takayuki Hama, Tokyo (JP); Masashi Numata, Tokyo (JP)

(73) Assignee: NEC CORPORATION, Tokyo (JP)

(*) Notice: Subject to any disclaimer, the term of this patent is extended or adjusted under 35 U.S.C. 154(b) by 61 days.

(21) Appl. No.: 13/818,012

(22) PCT Filed: Aug. 19, 2011

(86) PCT No.: PCT/JP2011/068765
§ 371 (c)(1),
(2), (4) Date: Feb. 20, 2013

(87) PCT Pub. No.: WO2012/023604
PCT Pub. Date: Feb. 23, 2012

(65) Prior Publication Data
US 2013/0148667 A1 Jun. 13, 2013

(30) Foreign Application Priority Data
Aug. 20, 2010 (JP) ................................ 2010-185429

(51) Int. Cl.
*H04L 12/46* (2006.01)
*H04L 12/70* (2013.01)
(Continued)

(52) U.S. Cl.
CPC ............ *H04L 45/08* (2013.01); *H04L 12/4633* (2013.01); *H04L 12/4641* (2013.01); *H04L 45/00* (2013.01)

(58) Field of Classification Search
None
See application file for complete search history.

(56) References Cited

U.S. PATENT DOCUMENTS 5,946,313 A * 8/1999 Allan et al. .................... 370/397
6,101,188 A * 8/2000 Sekine et al. ................. 370/401
(Continued)

FOREIGN PATENT DOCUMENTS

CN 1756238 A 4/2006
EP 1 643 715 A1 4/2006
(Continued)

OTHER PUBLICATIONS

Nick McKeown et al., "OpenFlow: Enabling Innovation in Campus Networks", [on line], [Searched on Jul. 26, Heisi 22 (2010)], Internet <URL: http://www.openflowswitch.org//documents/openflow-wp-latest.pdf>.
(Continued)

*Primary Examiner* — Ayaz Sheikh
*Assistant Examiner* — Tarell Hampton
(74) *Attorney, Agent, or Firm* — McGinn IP Law Group, PLLC

(57) ABSTRACT

When calculating a forwarding path for a packet, a control apparatus determines a second node on the exit side of the packet forwarding path and an output port thereof. Next, the control apparatus sets in a second node located upstream of the first node on the packet forwarding path a packet handling operation for writing flow identification information associated with the output port in a packet header field not to be referred to when the first node forwards the packet and rewriting address information in the packet header such that the packet arrives at the second node on the exit side, and then causing the packet to be forwarded. A packet handling operation for causing the packet with the flow identification information given thereto to be transmitted from the port associated with the flow identification information is set in the second node on the exit side.

20 Claims, 11 Drawing Sheets

(51) Int. Cl.
*H04L 12/751* (2013.01)
*H04L 12/701* (2013.01)

(56) References Cited

U.S. PATENT DOCUMENTS

| | | | |
|---|---|---|---|
| 6,181,680 B1* | 1/2001 | Nagata et al. | 370/248 |
| 6,577,625 B1 | 6/2003 | Chiou et al. | |
| 6,728,261 B1* | 4/2004 | Sasson et al. | 370/466 |
| 8,687,519 B2 | 4/2014 | Takacs | |
| 2003/0174715 A1* | 9/2003 | Yazaki | 370/397 |
| 2009/0041038 A1* | 2/2009 | Martini et al. | 370/401 |
| 2009/0052431 A1* | 2/2009 | Kroener et al. | 370/350 |
| 2009/0138577 A1 | 5/2009 | Casado et al. | |
| 2010/0111080 A1* | 5/2010 | Tiwana et al. | 370/389 |
| 2010/0166420 A1* | 7/2010 | Chung et al. | 398/9 |
| 2011/0164503 A1 | 7/2011 | Yong et al. | |

FOREIGN PATENT DOCUMENTS

| | | |
|---|---|---|
| JP | 2004-282111 A | 10/2004 |
| JP | 2004-304456 A | 10/2004 |
| JP | 2006-42044 A | 2/2006 |
| JP | 2006-245785 A | 9/2006 |
| JP | 2007-267426 A | 10/2007 |
| WO | WO 03/043276 A1 | 5/2003 |

OTHER PUBLICATIONS

"OpenFlow Switch Specification" Version 1.0.0 (Wire Protocol 0x01), [online], [Searched on Jul. 26, Heisei 22 (2010)], Internet <URL: http://www.openflowswitch.org/documents/openflow-spec-v1.0.0.pdf>.

W. Townsley et al., "Layer Two Tunneling Protocol "L2TP"", Network Working Group, Request for Comments: 2661, IETF, Aug. 1999, pp. 1-80.

S. Hanks et al., "Generic Routing Encapsulation", Network Working Group, Request for Comments: 1701, IETF, Oct. 1994, pp. 1-8.

L. Martini, Ed. et al., "Encapsulation Methods for Transport of Ethernet over MPLS Networks", Network Working Group, Request for Comments: 4448, IETF, Apr. 2006, pp. 1-24.

Iijima et al., NEC Technical Journal, vol. 62, No. 3, Sep. 25, 2009, pp. 117-120, "5. Jisedai Internet Gijutsu OpenFlow ni yoru Network no. Shodenryoku Seigyo" (pp. 119-120).

ISR in PCT/2011/068765 dated Sep. 13, 2011.

United States Office Action dated Jan. 2, 2015 in co-pending U.S. Appl. No. 13/817,979.

Chinese Office Action dated Sep. 9, 2014 with an English translation thereof.

United States Office Action dated Apr. 28, 2015 in co-pending U.S. Appl. No. 13/817,979.

\* cited by examiner

FIG. 8

Header Fields; MATCHING RULE: Ingress Port | Ether SA | Ether DA | Ether type | VLAN ID | VLAN Priority | IP SA | IP DA | IP protocol | IP ToS bits | TCP/UDP src port | TCP/UDP dst port Counters Actions

FIG. 9

| LAYER | FIELD |
|---|---|
| Physical | Ingress Port |
| Ethernet | Ether SA, Ether DA, Ether Type, VLAN ID, VLAN Priority |
| IPv4 | IP SA, IP DA, IP Proto, IP ToS bits |
| ICMP | ICMP Type (TCP/UDP src port), ICMP Code (TCP/UDP dst port) |
| ARP | Operation (IP Protocol), Source Hardware Address (USUALLY Ether SA), Source Protocol Address (USUALLY IP SA), Destination Hardware Address (USUALLY Ether DA), Destination Protocol Address (USUALLY IP SA) |

FIG. 10

| NAME OF ACTION | CONTENT OF ACTION |
|---|---|
| OUTPUT | OUTPUT TO SPECIFIED PORT |
| SET_VLAN_VID | UPDATE VLAN ID |
| SET_VLAN_PCP | UPDATE VLAN Priority |
| STRIP_VLAN | DELETE VALN ID |
| SET_DL_SRC | UPDATE MAC SA (Ether SA) |
| SET_DL_DST | UPDATE MAC DA (Ether DA) |
| SET_NW_SRC | UPDATE IP SA |
| SET_NW_DST | UPDATE IP DA |
| SET_NW_ToS | UPDATE IP ToS |
| SET_TP_SRC | UPDATE TCP/UDP Source Port |
| SET_TP_DST | UPDATE TCP/UDP Destination Port |
| VENDOR | VENDOR DEFINITION ACTION |

COMMUNICATION SYSTEM, CONTROL APPARATUS, COMMUNICATION METHOD, AND PROGRAM

CROSS-REFERENCE TO RELATED APPLICATIONS

The present invention is based upon and claims the benefit of the priority of Japanese Patent Application No. 2010-185429 (filed on Aug. 20, 2010), the disclosure of which is incorporated herein in its entirety by reference.

TECHNICAL FIELD

The present invention relates to a communication system, a control apparatus, a communication method, and a program. More specifically, the invention relates to a communication system including a node that performs packet forwarding by referring to an entry associating a port of the own node and address information of a node to which the packet forwarding can be performed from the port, and a node that performs forwarding of a received packet or the like according to a packet handling operation associating a process to be applied to the packet and a matching rule for identifying the packet to which the process is to be applied, a control apparatus, a communication method, and a program.

BACKGROUND

Each of Non Patent Literatures 1 and 2 describes a network architecture referred to as "OpenFlow". The OpenFlow is a network architecture where a control apparatus referred to as an OpenFlow controller controls an OpenFlow switch. In the OpenFlow, a packet forwarding function to be played by the OpenFlow switch and a path control function to be played by the OpenFlow controller are separated according to a flow control protocol. Then, the controller performs control over the OpenFlow switch, using a unified Application Program Interface (API). In the OpenFlow, packet control is performed for each flow used as a granularity of the control, in order to achieve a high speed data path and to reduce cost for the control.

The above-mentioned OpenFlow switch (which may be hereinafter written as an "OFS") includes a secure channel for communication with the OpenFlow controller and a flow table in which appropriate addition or rewriting is instructed from the OpenFlow controller. In the flow table, a set of a matching rule (Header Fields/matching rule) to be matched against a packet header, flow statistical information (Counters), and actions (Actions) defining processing contents is defined for each flow (see "3. Flow Table" on page 2 of Non Patent Literature 2).

FIG. 8 is an explanatory diagram showing a packet handling operation (flow entry) stored in the flow table. (Exact) values each for determining whether or not there is a match and wildcards (wild cards) can be set in respective fields of the matching rule (Header Fields/matching rule).

Details of the respective fields in FIG. 8 are described in "Table 3" on page 4 of Non Patent Literature 2. Each field in FIG. 8 can be associated with each layer of a hierarchical model, as shown in FIG. 9.

FIG. 10 illustrates names of actions and contents of the actions defined in Non Patent Literature 2. OUTPUT is an action for outputting a packet to a specified port (interface). SET_VLAN_VID down to SET_TP_DST are actions for modifying the fields of the packet header. When a code of "SET_DL_DST" is set in an action field, for example, a process of "updating the MAC DA (of a destination apparatus) of a packet matching the packet handling operation (flow entry)" is performed.

The Flow statistical information (Counters) in FIG. 8 includes the counters that record the numbers of packets and the number of bytes for each flow and the number of packets and the number of bytes for each port and an elapsed period of time (session continuation time: duration) since the packet was last received. The flow statistical information is used for determining whether or not the packet handling operation (flow entry) is to be deleted or not (see "Table 4" in Non Patent Literature 2).

When the OpenFlow switch receives a first packet (first packet), for example, the OpenFlow switch searches the flow table for a packet handling operation (flow entry) having a matching rule that matches header information of the received packet. When the packet handling operation (flow entry) matching the received packet is found as a result of the search, the OpenFlow switch executes processing content described in the action field of the entry on the received packet. On the other hand, when the packet handling operation (flow entry) having the matching rule that matches the received packet is not found as a result of the search, the OpenFlow switch forwards information on the received packet (or the received packet itself) to the OpenFlow controller via a secure channel, asks the OpenFlow controller to determine a packet path based on the transmission source and the transmitting destination of the received packet, receives a flow entry that implements this path to update the flow table. Thereafter, when the OpenFlow switch receives a packet matching the added packet handling operation (flow entry), the OpenFlow switch can execute the corresponding processing content without making an inquiry to the OpenFlow controller.

A message to be exchanged between the OpenFlow switch and the OpenFlow controller over the secure channel is described in "4 Secure Channel" on page 9 of Non Patent Literature 2. The OpenFlow controller in the above-mentioned Patent Literatures 1 and 2 collects flow statistical information (Counters) from the OpenFlow switch that operates as described above, dynamically sets a path (flow entry (packet handling operation) that implements the path) for each OpenFlow switch according to the communication policy and the current load state of the network. The OpenFlow controller can thereby perform path control, load distribution, and the like according to the communication policy.

Patent Literatures 1 and 2 and Non Patent Literatures 3 to 5 are literatures that disclose a technology for implementing tunneling by encapsulation. Patent Literatures 3 and 4 are literatures that implement tunneling by header rewriting without using encapsulation. Relevance of these literatures with the present invention will be described later.
[Patent Literature 1]
International Publication No. WO2003/043276
[Patent Literature 2]
JP Patent Kokai Publication No. JP2007-267426A
[Patent Literature 3]
JP Patent Kokai Publication No. JP2006-42044A
[Patent Literature 4]
JP Patent Kokai Publication No. JP2006-245785A
[Non Patent Literature 1]
Nick McKeown and seven other authors, "OpenFlow: Enabling Innovation in Campus Networks", [on line], [Searched on July 26, Heisei 22 (2010)], Internet <URL: http://wwvv.openflowswitch.org//documents/openflow-wp-latest.pdf>

[Non Patent Literature 2]
"OpenFlow Switch Specification" Version 1.0.0 (Wire Protocol 0x01), [online], [Searched on July 26, Heisei 22 (2010)], Internet <URL: http://www.openflowswiteh.org/documents/openflow-spec-v1.0.0.pdf>

[Non Patent Literature 3]
W. Townsley and five other authors, "Layer Two Tunneling Protocol "L2TP"", "Network Working Group, Request for Comments: 2661, IETF, August 1999

[Non Patent Literature 4]
S. Hanks and three other authors, "Generic Routing Encapsulation", Network Working Group, Request for Comments: 1701, IETF, October 1994

[Non Patent Literature 5]
L. Martini, Ed. and three other authors, "Encapsulation Methods for Transport of Ethernet over MPLS Networks", Network Working Group, Request for Comments: 4448, IETF, April 2006

SUMMARY

Each disclosure of the above-listed Patent Literatures and Non Patent Literatures is incorporated herein by reference. The following analysis is made by the inventors of the present invention.

Now, lets us consider communication between OFSs in an environment where OFSs 210 to 230 and a layer 2 switch (L2SW) 260 such as a switching hub that forwards a packet by referring to a MAC (Media Access Control) address table coexist, as shown in FIG. 11.

Each of the OSFs 210 to 230 can freely modify the packet header of a packet or the like, and the layer 2 switch (L2SW) 260 performs the operation of forwarding the packet by referring to the MAC address table. Then, by using a tunneling technique, the layer 2 switch (L2SW) can be made to perform a relay operation. To take an example, using one of IEEE802.1ah (in Patent Literature 1) and layer 2TP (in Non Patent Literature 3) of layer 2 tunneling protocols or one of GRE (in Non Patent Literature 4) and Ethernet over MPLS (in Non Patent Literature 5) of layer 3 tunneling protocols, the relay can be achieved. The relay can be achieved by encapsulation for adding the header of the tunneling protocol to the payload of the packet when forwarding the packet from the OFS 210 to the layer 2 switch (L2SW) 110 and decapsulation for removing the tunneling protocol header from the payload of the packet when forwarding the packet to the OFS 220 from the layer 2 switch (L2SW) 260.

In the OpenFlow protocol version 1.0.0 in Non Patent Literature 2, however, the tunneling as mentioned above is not defined as a standard. As a result, the tunneling function described in each of Patent Literatures 1 and 2 and Non Patent Literatures 3 to 5 becomes an implementation depending on each switch. Compatibility is thereby impaired.

Next, a method capable of implementing tunneling by packet header rewriting described in each of Patent Literatures 3 and 4 will be considered. In the method in Patent Document 3, for example, each of first and second tunneling apparatuses is physically and logically connected to a plurality of IP networks. Then, an IP address is assigned to each of the first and second tunneling apparatuses from each of the connected IP networks. When a first communication apparatus connected to the first tunneling apparatus and having an IP address and a second communication apparatus connected to the second tunneling apparatus and having an IP address perform communication via one of the IP networks, tunneling is implemented between the first tunneling apparatus and the second tunneling apparatus only by IP address translation.

More specifically, each of the first tunneling apparatus and the second tunneling apparatus in Patent Literature 3 prepares and holds transformation tables each constituted from a set of "the IP address of its own tunneling apparatus on a default route", "the IP address of a partner tunneling apparatus on the default route", "the IP address of its own tunneling apparatus for forming a tunnel", "the IP address of the partner tunneling apparatus for forming the tunnel", and "the IP address of a communication apparatus".

When the first tunneling apparatus receives an IP packet from the first communication apparatus, the first tunneling apparatus searches in the translation tables to find the translation table whose "IP address of a communication apparatus" and "IP address of a partner tunneling apparatus on the default route" match the transmission source address and the destination address of the received IP packet, thereby deriving the associated "IP address of its own tunneling apparatus for forming a tunnel" and the associated "IP address of the partner tunneling apparatus for forming the tunnel". Then, the first tunneling apparatus respectively translates the transmission source IP address and the destination IP address included in the received IP packet into the derived "IP address of its own tunneling apparatus for forming the tunnel" and the "IP address of the partner tunneling apparatus for forming the tunnel", and then forwards the packet to the IP network.

When the second tunneling apparatus receives the IP packet from the IP network, the second tunneling apparatus searches the translation tables to find the translation table whose "IP address of its own tunneling apparatus for forming a tunnel" and the "IP address of the partner tunneling apparatus for forming the tunnel" match the destination IP address and the transmission source IP address number included in the received IP packet, thereby deriving the associated "IP address of a partner tunneling apparatus on the default route" and the associated "IP address of a communication apparatus". Then, the second tunneling apparatus respectively translates the transmission source IP address and the destination IP address included in the received IP packet into the derived "IP address of the partner tunneling apparatus for forming the tunnel" and the "IP address of the communication apparatus", and then forwards the IP packet to the second communication apparatus.

In the method disclosed in Patent Literature 3 as mentioned above, IP address translation is performed. This method can be accommodated by replacing the first and second tunneling apparatus with OpenFlow switches defined in Non Patent Literature 2.

In the method disclosed in Patent Literature 3, however, a translation destination IP address is necessary for each communication apparatus, and each layer 2 switch disposed between the first and second tunneling apparatuses learns a MAC address for each IP address. Thus, there is a problem that the number of communication apparatuses for which tunneling is allowed depends on the number of MAC addresses that can be learned by the layer 2 switch. The number of entries in a MAC address table is normally 4096 to 98304 entries. The number of the MAC addresses obtained by subtracting the number of tunneling apparatuses from the number of the entries in the MAC address table is an upper limit.

Normally, in 300 seconds, time-out occurs for each entry in the MAC address table, and each entry disappears (this phenomenon is also referred to as aging (Aging)). The MAC address that has not been learned is broadcast all over the network. Thus, there is also a problem that as many as 328 broadcast packets/second on average are generated in order to maintain the network such that an upper limit of 98,304 entries of the MAC addresses are not deleted, thereby placing a heavy load on the network.

Further, in the method described in Patent Document 4, information on an output port is given to a packet, thereby reducing a burden of a transmitting destination port resolution process at a router on an exit side. However, there remains the above-mentioned problem that, according to the number of IP addresses and the number of entries in a MAC address table, the number of communication apparatuses for which tunneling is allowed is constrained.

The present invention has been made in view of the above-mentioned situation. It is an object of the present invention therefore to provide a configuration that allows implementation of tunneling in an environment where a forwarding node (first node) such as a switching hub and a node (second node) compliant with specifications in Non Patent Literature 2 coexist, wherein a constraint on the number of communication terminals for which the tunneling is allowed can be eliminated, and a network load can also be reduced.

According to a first aspect, of the present invention, there is provided a communication system, comprising:
a first node(s) that forwards a received packet by referring to an address table associating a port(s) of an own first node(s) and address information of a node(s) to which the received packet may be forwarded from the port(s);
at least one second node disposed on each of an entry side and an exit side of a packet forwarding path that passes via the first node(s), each of the at least one second node comprising a packet processing unit that processes the received packet according to a packet handling operation associating a process to be applied to the packet and a matching rule for identifying the packet to which the process is to be applied; and
a control apparatus that sets the packet handling operation in the second node;
the control apparatus comprising:
a path search unit that determines a packet forwarding path, one of the at least one second node, located on the exit side of the packet forwarding path, and an output port of the second node located on the exit side of the packet forwarding path in order to transmit the packet belonging to a new flow to a target address, based on a request from one of the at least one second node, located on the entry side; and
a packet control command generation unit, the packet control command generation unit setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded, the packet control command generation unit setting in the second node located on the exit side of the packet forwarding path a packet handling operation for causing the packet with the flow identification information given thereto to be transmitted from the port associated with the flow identification information.

According to a second aspect, there is provided a control apparatus, connected to a first node(s) that forwards a received packet by referring to an address table associating a port(s) of an own first node(s) and address information of a node(s) to which the received packet may be forwarded from the port, and at least one second node disposed on each of an entry side and an exit side of a packet forwarding path that passes via the first node(s), each of the at least one second node comprising a packet processing unit that processes the received packet according to a packet handling operation associating a process to be applied to the packet and a matching rule for identifying the packet to which the process is to be applied, the control apparatus comprising:
a path search unit that determines a packet forwarding path, one of the at least one second node located on the exit side of the packet forwarding path, and an output port of the second node located on the exit side of the packet forwarding path in order to transmit the packet belonging to a new flow to a target address, based on a request from one of the at least one second node, located on the entry side; and
a packet control command generation unit, the packet control command generation unit setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded, the packet control command generation unit setting in the second node located on the exit side of the packet forwarding path a packet handling operation for causing the packet with the flow identification information given thereto to be transmitted from the port associated with the flow identification information.

According to a third aspect, there is provided a communication method by a control apparatus, connected to a first node(s) that forwards a received packet by referring to an address table associating a port(s) of an own first node(s) and address information of a node to which the received packet may be forwarded from the port(s) and at least one second node disposed on each of an entry side and an exit side of a packet forwarding path that passes via the first node, each of the at least one second node comprising a packet processing unit that processes the received packet according to a packet handling operation associating a process to be applied to the packet and a matching rule for identifying the packet to which the process is to be applied, the communication method being for causing the packet to be forwarded from one of the at least one second node, on the entry side to one of the at least one second node, on the exit side via the first node(s), the communication method comprising the steps of:
determining a packet forwarding path, the second node located on the exit side of the packet forwarding path, and an output port of the second node located on the exit side of the packet forwarding path in order to transmit the packet belonging to a new flow to a target address, based on a request from the second node located on the entry side;
setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded; and
setting in the second node located on the exit side of the packet forwarding path a packet handling operation for causing the packet with the flow identification information given thereto to be transmitted from the port associated with the flow identification information. This method is linked with a specific machine, which is a computer comprising the control apparatus that controls the second nodes.

According to a fourth aspect, there is provided a program for a computer comprising a control apparatus connected to a first node(s) that forwards a received packet by referring to an address table associating a port(s) of an own first node(s) and address information of a node(s) to which the received packet may be forwarded from the port(s) and at least one second node disposed on each of an entry side and an exit side of a packet forwarding path that passes via the first node(s), the at least one second node comprising a packet processing unit that processes the received packet according to a packet handling operation associating a process to be applied to the packet and a matching rule for identifying the packet to which the process is to be applied, the program causing the computer to execute the processes of:

determining a packet forwarding path, one of the at least one second node, located on the exit side of the packet forwarding path, and an output port of the second node, located on the exit side of the packet forwarding path in order to transmit the packet belonging to a new flow to a target address, based on a request from one of the at least one second node located on the entry side;

setting in one of the at least one second node, located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded; and setting in the second node located on the exit side of the packet forwarding path a packet handling operation for causing the packet with the flow identification information given thereto to be transmitted from the port associated with the flow identification information. This program may be recorded in a computer readable recording medium. That is, the present invention may also be embodied as a computer program product.

The meritorious effects of the present invention are summarized as follows.

According to the present invention, in an environment where a first forwarding node(s) and second node(s) compliant with specifications in Non Patent Literature 2 coexist, it becomes possible to eliminate a constraint on the number of communication terminals for which tunneling is allowed and also to reduce a network load.

BRIEF DESCRIPTION OF DRAWINGS

FIG. 8 is a diagram showing a configuration of a flow entry described in Non Patent Literature 2.

FIG. 9 is a table showing a correspondence relationship between each field of the flow entry in FIG. 8 and a layer.

FIG. 10 is a table showing names of actions and contents of the actions described in Non Patent Literature 2.

PREFERRED MODES

Figure 1:
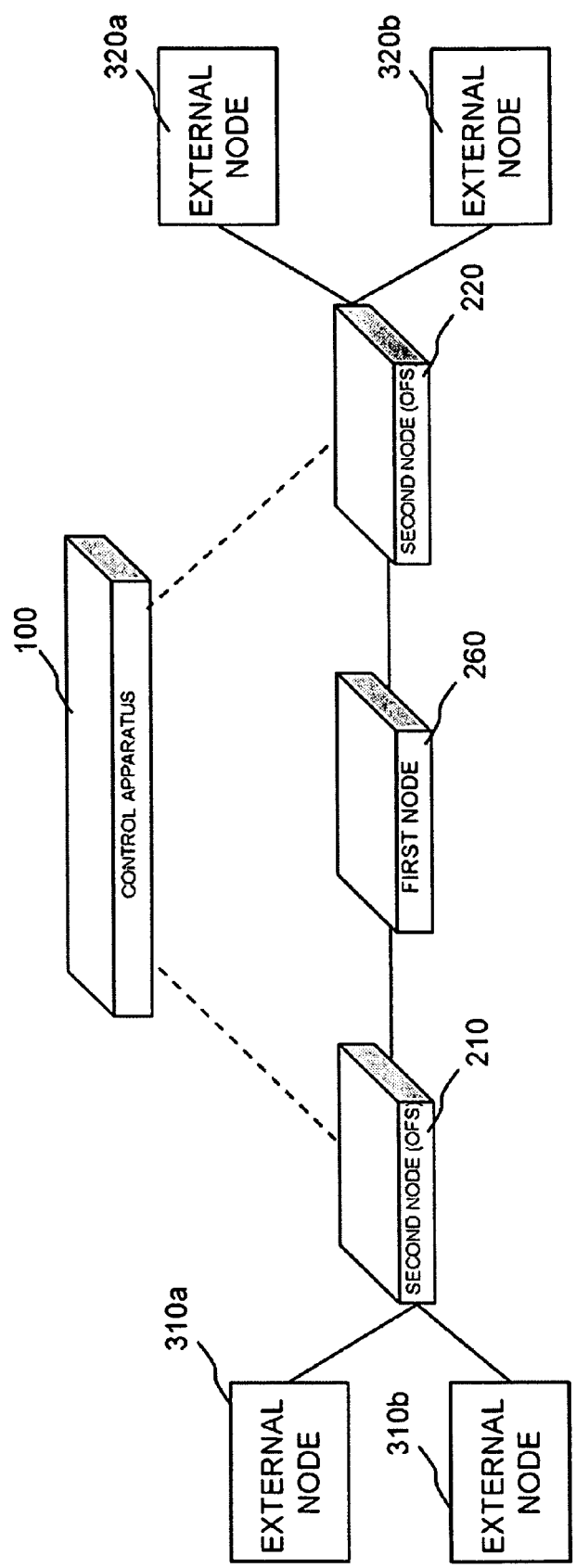
FIG. 1 is a diagram for explaining an outline summary of the present invention.

First, the outline of an exemplary embodiment of the present invention will be described with reference to a drawing. As shown in FIG. 1, the exemplary embodiment of the present invention can be implemented by an environment where a first node 260, second nodes (OFSs) 210 and 220 and a control apparatus 100 are included. The first node 260 forwards a received packet by referring to an address table holding information on the address of a node connected to a port(s) of own node (first node) 260. Each of the second nodes (OFSs) 210 and 220 includes a packet processing unit that processes the received packet according to a packet handling operation that associates a process to be applied to the packet and a matching rule for identifying the packet to which the process to be applied. At least one of the second node (OFS) 210, 220 is disposed on each of an entry side and an exit side of a packet forwarding path that passes vis the first node(s). The control apparatus 100 sets the packet handling operation in (each of) the second nodes 210 and 220. As to reference symbol in the drawing appended to this outline, it is appended to each element for the sake of convenience, as an example for helping understanding of the disclosure, and there is no intension to limit the present invention to the mode(s) illustrated in the drawing(s).

The control apparatus 100 includes a path search unit and a packet control command generation unit. Based on a request from the second node 210 of the second nodes located on the entry side as seen from an external node (such as an external node 310a) for forwarding a packet, the path search unit determines a packet forwarding path, the second node on the exit side of the packet forwarding path, and the output port of the second node, in order to transmit the packet belonging to a new flow to a target address. The packet control command generation unit sets in the second node (second node 210 in the case of FIG. 1) located upstream of the first node on the packet forwarding path a packet handling operation for writing flow identification information associated with the output port in a field of a packet header not to be referred to when the first node forwards the packet and rewriting address information in the packet header so that the packet will arrive at the second node on the exit side, and then causing the packet to be forwarded. The packet control command generation unit sets in the second node located on the exit side of the packet forwarding path a packet handling operation for causing the packet with the flow identification information given thereto to be transmitted from the port associated with the flow identification information.

Assume, for example, that when the external node 310a transmits a packet to an external node 320a, the control apparatus 100 determines to forward the packet in the order of the second node (OFS) 210, the first node 260, and the second node (OFS) 220 and then to causes the packet to be output from a first port of the second node (OFS) 220, by referring to a network topology and positions to which the external node 310a and the external node 320a are connected.

In this case, the control apparatus 100 sets in the second node (OFS) 210 on the entry side a packet handling operation for writing the flow identification information (such as #1) associated with the output port in the field of the packet header (such as an IP ToS bits field in FIG. 8) not to be referred to when the first node 260 forwards the packet and rewriting the MAC address of the packet header to the MAC address of the second node on the exit side, and then causing the packet to be forwarded.

Further, the control apparatus 100 sets in the second node (OFS) 220 located on the exit side of the packet forwarding path the packet handling operation setting an action for causing the packet with the flow identification information given thereto to be transmitted from the port associated with the flow identification information.

With the above arrangement, the packet header is rewritten at the second node (OFS) 210 on the entry side. Thus, the packet transmitted from the external node 310a is forwarded in the order of the first node 260 and the second node (OFS) 220 on the exit side, and is then output from the first port of the second node 220, thereby arriving at the external node 320a.

The contents of the packet header to be modified and written by the control apparatus 100 in this case are the flow identification information (such as #1) and the address information for causing the packet to arrive at the second node 220 on the exit side. For this reason, same address information can be used for a same path even if one or both of the external nodes are different. Thus, there almost disappears a constraint on the number of terminals (the number of external nodes) for which tunneling is allowed based on the upper limit of the number of entries in a MAC address table described at the beginning of the description. On the other hand, each flow can be identified by flow identification information even if the same path is used. Thus, the second node 220 can be made to identify a forwarding destination for each flow.

FIRST EXEMPLARY EMBODIMENT

Figure 2:
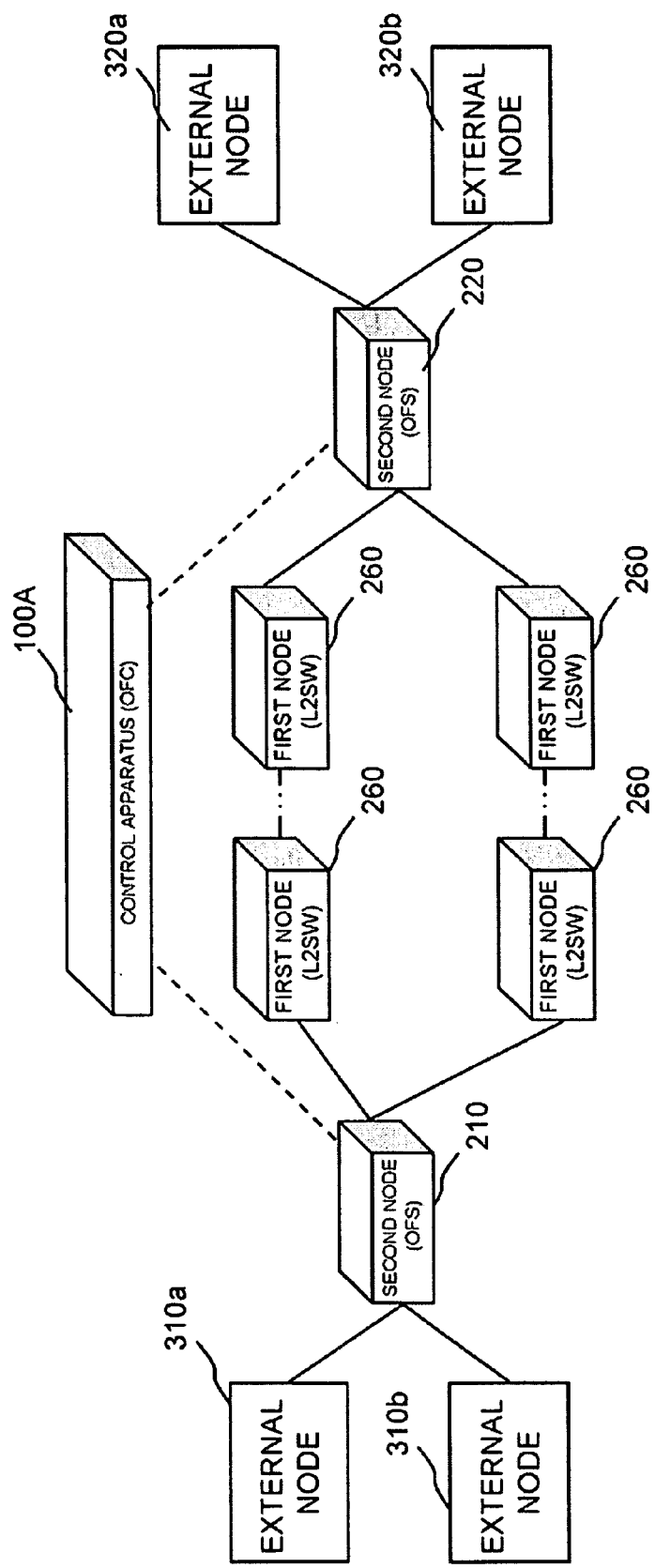
FIG. 2 is a diagram showing an overall configuration of a first exemplary embodiment of the present invention.

Next, a first exemplary embodiment of the present invention will be described in detail with reference to drawings. FIG. 2 is a diagram showing an overall configuration of the first exemplary embodiment. Referring to FIG. 2, the configuration including a plurality of first nodes 260, second nodes (OFSs) 210 and 220, and a control apparatus (OFS) 100A capable of controlling the second nodes (OFSs) 210 and 220 is shown.

Each of the first nodes 260 is a relay apparatus such as a switching hub, a repeater hub, or the like that is not controlled by the control apparatus (OFC) 100A. A description will be given below, assuming that the first node 260 is a layer 2 switch (L2SW) equivalent to the switching hub.

Each of the second nodes (OFSs) 210 and 220 is a relay apparatus equivalent to an OpenFlow switch compliant with specifications in Non Patent Literature 2 which includes a flow table holding a packet handling operation (flow entry) and a packet processing unit for processing a received packet according to the packet handling operation (flow entry). External nodes 310a and 310b are connected to the second node (OFS) 210, and external nodes 320a and 320b are connected to the second node (OFS) 220. In the example in FIG. 2, only the second nodes (OFSs) 210 and 220 are shown. A second node (OFS) may be disposed at an arbitrary position other than the positions where the second nodes (OFSs) 210 and 220 are disposed. To take an example, a configuration may also be adopted where the second node (OFS) is disposed between the first nodes 260 to forward a packet, rewrite a packet header, discard a packet or the like according to control by the control apparatus (OFC) 100A.

The external node(s) 310a, 310b, 320a, and 320b is a user terminal, a server that provides a service according to a request from a user terminal, a VPN (Virtual Private Network) client that is connected to a network according to a request from a user terminal, or the like.

The control apparatus (OFC) 100A is an apparatus that controls the second nodes (OFSs) 210 and 220, like the open flow controller described in Non Patent Literatures 1 and 2. A difference of the control apparatus (OFC) 100A from the open flow controller in Non Patent Literatures 1 and 2 will be described later, with reference to FIG. 3.

In the following description, the second nodes (OFSs) 210 and 220 and the first nodes (L2SW) 260 will be referred to as a "domain" as a whole.

Figure 3:
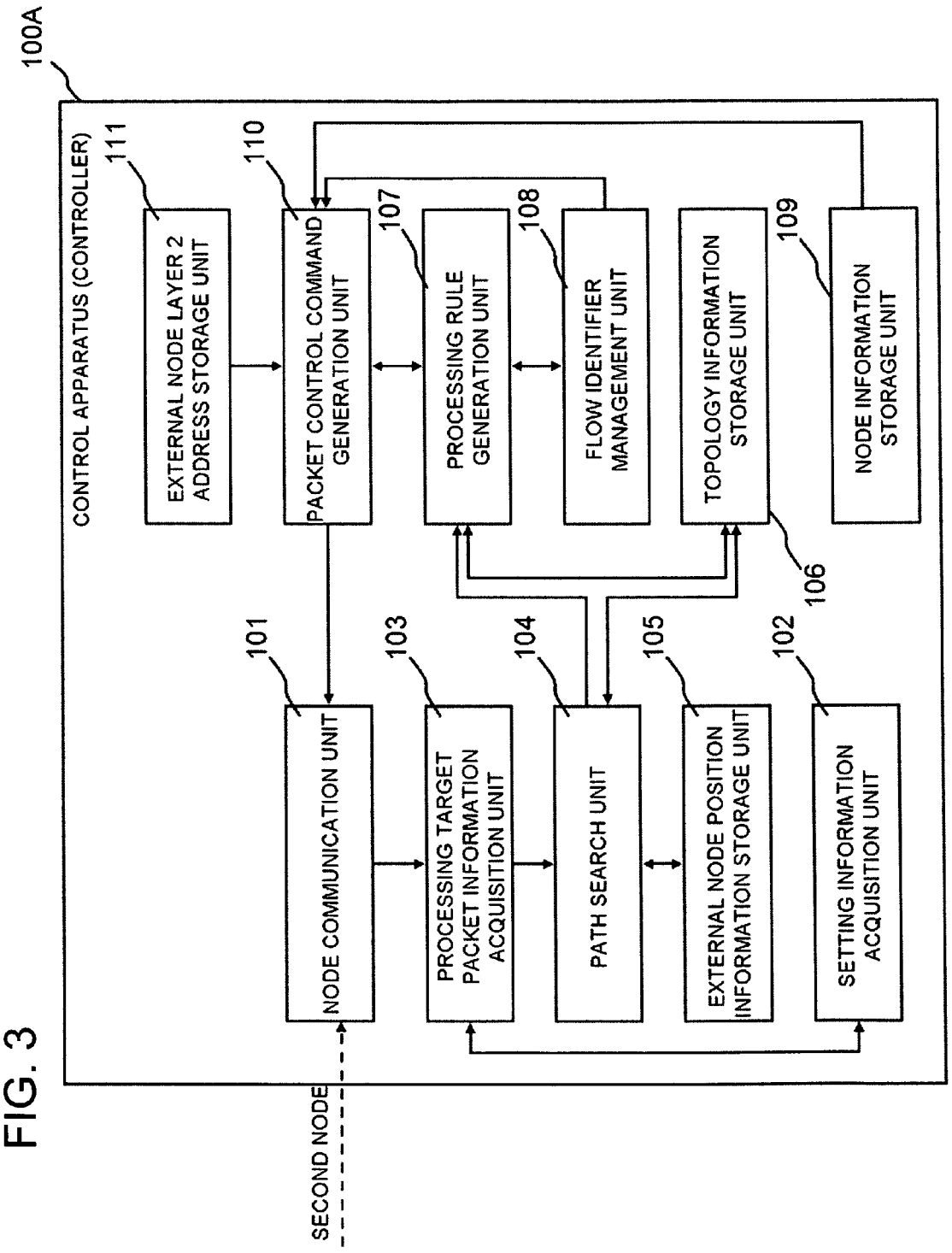
FIG. 3 is a block diagram showing a detailed configuration of a control apparatus in the first exemplary embodiment of the present invention.

FIG. 3 is a block diagram showing a detailed configuration of the control apparatus (OFC) 100A. Referring to FIG. 3, the configuration including a node communication unit 101, a setting information acquisition unit 102, a processing target packet information acquisition unit 103, a path search unit 104, an external node position information storage unit 105, a topology information storage unit 106, a packet handling operation generation unit 107, a flow identifier management unit 108, a node information storage unit 109, a packet control command generation unit 110, and an external node layer 2 address storage unit 111 is shown. The node communication unit 101 performs communication for control with each of the second nodes (OFSs) 210 and 220. The setting information acquisition unit 102 obtains setting information from an outside. The processing target packet information acquisition unit 103 obtains information on a packet to be processed from the node communication unit 101 and the setting information acquisition unit 102. The path search unit 104 searches a forwarding path for the packet to be processed. The external node position information storage unit 105 stores a correspondence relationship among each layer 3 address(es), the second nodes (OFSs) 210 and 220 each holding the layer 3 address, and flow(s) (matching rule). The topology information storage unit 106 manages a network topology including the second nodes (OFS) 210 and 220 and the first nodes (L2SW). The packet handling operation generation unit 107 performs generation of a packet handling operation (flow entry) including assignment of a unique ID (hereinafter referred to as a "flow identifier") capable of uniquely identifying a flow. The flow identifier management unit 108 manages the flow identifier and an action that can be assigned. The node information storage unit 109 stores a correspondence relationship between each port of the second nodes (OFSs) 210 and 220 connected to the first node (L2SW) 260 and an address (MAC address) used by each of the second nodes (OFSs) 210 and 220 for communication with the first node (L2SW) 260. The packet control command generation unit 110 causes each of the second nodes (OFSs) 210 and 220 to set the generated packet handling operation (flow entry) and execute a transmission operation of a learning packet. The external node layer 2 address storage unit 111 stores layer 2 addresses of the external nodes 310a to 320b.

Configurations of the above-mentioned respective processing units (processing means) of the control apparatus (OFC) 100A shown in FIG. 3 are illustrated in order to plainly explain the present invention. The configurations may arbitrarily be consolidated or further subdivided. The respective processing units (processing means) of the control apparatus (OFC) 100A may also be implemented by a computer program that causes a computer constituting the control apparatus (OFC) 100A to execute each process that will be described later, using hardware of the computer.

A flow (matching rule) herein may be a matching condition (that can use a wildcard) in an arbitrary field in each layer shown in FIG. 9. An entry port of the second node may be specified for the flow.

Configurations of the respective units of the control apparatus (OFC) 100A will be described below, using a case where a packet addressed to the external node 320b has entered into the second node (OFS) 210 from the external node 310b in FIG. 4, as an example.

The node communication unit 101 establishes a control session with each of the second nodes (OFSs) 210 and 220 and performs control command transmission and reception. For control commands, an OpenFlow protocol described in Non Patent Literature 2 may be used. Alternatively, a CUI (command line interface) via Telnet or an SNMP (Simple Network Management Protocol) may be used to perform communication.

The setting information acquisition unit 103 is a unit for reading setting information from an external file or a database.

The processing target packet information acquisition unit 103 obtains the transmitting destination layer 3 address of the packet to be processed through the node communication unit 101 and the setting information acquisition unit 102. When the control apparatus 100A receives a (Packet-in) message requesting setting of a packet handling operation (flow entry) from the second node (OFS) 210, the processing target packet information acquisition unit 103 obtains the IP (Internet Protocol) address from information on the packet or the packet header received from the second node (OFS) 210, as the layer 3 address, through the node communication unit 101.

The path search unit 104 obtains from the external node position information storage unit 105 the position of the external node corresponding to the layer 3 destination address, or the second node (OFS) 220 that is located at the exit of the domain and will be a transmitting destination and the flow (matching rule), and then searches a path according to the network topology stored in the topology information storage unit 106. The following description will be given, assuming that the path from the second node (OFS) 210 as the entry of the domain to the second node (OFS) 220 through a plurality of the first nodes (L2SWs) 260 has been calculated for the packet addressed to the external node 320b, which has been transmitted from the external node 310b, in FIG. 2.

The packet handling operation generation unit 107 assigns a unique ID (hereinafter referred to as a "flow identifier") capable of uniquely identifying the flow at the second node (OFS) 220 that will be the transmitting destination, by referring to the flow identifier management unit 108, specifies an action for causing a forwarding process from a predetermined port or the like to be executed, thereby generating the packet handling operation (flow entry). The packet handling operation generation unit 107 registers in the flow identifier management unit 108 the flow identifier and the action that have been generated.

The flow identifier may be generated by various methods if the second node (OFS) 220 can identify the flow. To take an example, the flow identifier may be generated into a unique composite key by incorporating one or both of the layer 3 transmission source address and the transmitting destination layer 3 address. The flow identifier may be assigned to be a unique composite key by incorporating the input port of the second node (OFS) 220 that will be the transmitting destination, as well. Alternatively, the flow identifier may be assigned to be a unique composite key by incorporating one or both of the transmission source layer 2 address and the transmitting destination layer 2 address used for communication through the first nodes (L2SW) 260.

The action may include a command to add an identifier for multiplexing the network at the exit port, in addition to a command for causing output of the packet from the specified port to be executed as described above. As the identifier for multiplexing at the exit port, a TAG-VLAN ID of IEEE802.1Q, a service VLAN tag (S-TAG), a service VLAN identifier (S-VID), a customer VLAN tag (C-TAG), or the like of IEEE802.1ad, in Ethernet (registered trade mark) can be pointed out. Alternatively, a label of MPLS (Multi-Protocol Label Switching) that operates at a layer referred to as a layer 2.5 may be used as the identifier for multiplexing at the exit port.

When the OpenFlow protocol in Non Patent Literature 2 is used for the control commands, an Action in Flow Mod message can be used as the action. As the Action in Flow Mod message, the output port is specified using an OUTPUT command. In addition, an action for updating an IP ToS bits field to zero may be added when the flow identifier is written in the IP ToS bits field. When the TAG-VLAN ID is used as the identifier for multiplexing the network at the exit port, an action for rewriting the TAG VALN ID may be added. An action in Flow Mod message other than those mentioned above may be of course included.

The packet control command generation unit 110 generates the control commands for causing each of the second nodes (OFSs) 210 and 220 to hold the packet handling operation (flow entry) and to execute a specific process, and then transmits the control commands to the second nodes (OFSs) 210 and 220 through the node communication unit 101.

Specifically, the packet control command generation unit 110 generates, for the second node (OFS) 210, the command for modifying the header of the packet to be processed so that the header of the packet includes the flow identifier, the command for changing the transmitting destination layer 2 address of the packet to the layer 2 address of the input port (input port to be used for communication with the first node (L2SW) 260) of the second node (OFS) 220 on the exit side read from the node information storage unit 109, and the command corresponding to the action associated with the flow identifier read from the flow identifier management unit 108.

Assume that the flow identifier is included in the packet header. Then, the field of a layer (higher-order layer than a layer 2) not to be referred to by the first node (L2SW) when the first node (L2SW) forwards the packet is used. In the case of an IP packet, for example, a service type field, an IP option field, or an ID field can be used. When the first node (L2SW) 260 uses the identifier for multiplexing the network, the packet control command generation unit 110 can also generate a command for giving this identifier for multiplexing.

In addition to the transmitting destination layer 2 address of the packet, the transmission source layer 2 address of the packet may be changed at the second node (OFS) 210. In this case, the packet control command generation unit 110 generates a command for changing the transmission source layer 2 address of the packet to the layer 2 address which has been read from the node information storage unit 109 and will be used by the second node (OFS) 210 for communication with the first node (L2SW) 260.

When the OpenFlow protocol described in Non Patent Literature 2 is used for these control commands, a Flow Mod (packet handling operation (flow entry) add command) specifying the transmitting destination layer 3 address can be used as a Match condition. Specifically, in the action field of the Flow Mod, a SET_NW_TOS command can be set to change the flow identifier, a SET_DL_DST command can be set to change the destination layer 2 address, and the OUTPUT command can be set to cause output from the output port to be executed. When the TAG-VLAN ID is used as the identifier for multiplexing the network at the first node 260, a process of setting a SET_VLAN_ID command and then giving the TAG-VLAN ID to the packet is added.

When the packet handling operation (flow entry) associated with a packet received from the first node (L2SW) cannot be found as a result of search of the flow table, the second node (OFS) 210 can set the received packet to be discarded. Specifically, when the second node (OFS) 210 receives the packet other than a packet for checking electrical conduction of the path at a port thereof used for communication with the first node (L2SW) 260, a packet handling operation (flow entry) for dropping (discarding) this packet can be set in a low-order position of the flow table, thereby avoiding transmission of the Packet-In message to the control apparatus (OFC) 100A. With respect to a broadcast packet as well, the priority of the broadcast packet may be set to be low and may be set to be dropped (discarded) in advance, thereby avoiding transmission of the Packet-in message to the control apparatus (OFC) 100A. With such settings, a load on the control apparatus (OFC) 100A can be reduced.

For the second node (OFS) 220, the packet control command generation unit 110 identifies the flow according to the flow identifier of the packet received at the input port of the second node (OFS) 220, which has been modified at the second node (OFS) 210, and then reads the layer 2 address of the external node associated with the transmitting destination layer 3 address from the external node layer 2 address storage unit 111. Then, the packet control command generation unit 110 generates the command for changing the transmitting destination layer 2 address of the packet to the layer 2 address of the external node. The packet control command generation unit 110 also generates the command for specifying the action associated with the flow (matching rule). If necessary, the packet control command generation unit 110 may generate a command for adding the identifier for multiplexing the network to the header of the packet.

As the flow identifier, the flow identifier capable of uniquely identifying the flow may be used. One or both of the transmitting destination layer 3 address and the transmission source layer 3 address may be incorporated to allow identification of the flow and the identifier for multiplexing the layer 2. In addition to these generation methods of the flow identifier, another method of incorporating the input port into the flow identifier, for use, may also be adopted.

The second node (OFS) 220 may change the transmission source layer 2 address of the packet, in addition to the transmitting destination layer 2 address of the packet. In this case, the packet control command generation unit 110 may read the layer 2 address associated with the transmission source layer 3 address from the external node layer 2 address storage unit 111, and may generate a command for changing the transmission source layer 2 address of the packet.

When the OpenFlow protocol described in Non Patent Literature 2 is used for these control commands, the Flow Mod specifying the IP ToS bits field can be used as a Match condition. The Flow Mod specifying one or both of the transmission source layer 3 address and the transmitting destination layer 3 address can be used according to the assigned flow identifier. Specifically, in the action field of the Flow Mod, the SET_DL_DST command can be set to change the destination layer 2 address, and the OUTPUT command can be set to cause output from the output port to be executed. In this case, the IP ToS bits field may be updated to zero by the SET_NW_TOS command. When the TAG-VLAN ID is used as the identifier for multiplexing the network, an action of giving the TAG VLAN ID to the packet is added.

When the second node (OFS) 220 receives a packet other than a packet for checking electrical conduction of the path at a port thereof used for communication with the first node (L2SW) 260, a packet handling operation (flow entry) for setting the priority of this packet to be low and dropping (discarding) this packet can be set, thereby avoiding transmission of the Packet-In message to the control apparatus (OFC) 100A. With respect to a broadcast packet as well, the priority of the broadcast packet may be set to be low and may be set to be dropped (discarded) in advance, thereby avoiding transmission of the Packet-in message to the control apparatus (OFC) 100A. With such settings, a load on the control apparatus (OFC) 100A can be reduced.

A method of indirectly controlling the first node (L2SW) 260 by the control apparatus (OFC) 100A will be described now. When the first node (L2SW) 260 includes a function of learning an address table used for packet forwarding, like a switching hub, the packet control command generation unit 110 controls the second node (OFS) 220 to periodically generate and transmit a leaning packet whose transmission source layer 2 address is set to the layer 2 address of the port of the second node (OFS) 220 to the first node(s) (L2SW) 260. With this arrangement, the first node (L2SW) 260 can be made to update the address table. There can also be adopted a method of causing the first node (L2SW) 260 to rewrite the address table used for packet forwarding through the second nodes 210 and 220 so that a packet addressed to the layer 2 address of the second node (OFS) 220 arrives at the second node (OFS) 220, instead of transmitting the learning packet.

Preferably, the transmission interval of the learning packet or the update interval of the address table is less than a time-out value for each entry in the address table (e.g., less than 300 seconds when the first node (L2SW) 260 is the switching hub and when a time-out value for the MAC address table is the initial value of 300 seconds).

Next, operation of this exemplary embodiment will be described in detail with reference to FIGS. 4 and 5. When the external node 310b (whose IP address=192.168.0.2) transmits a packet to the external node 320b (whose IP address=192.168.1.4) as shown in FIG. 4 (in step S001), the second node 210 transmits the (Packet-in) message requesting packet handling operation (flow entry) setting to the control apparatus (OFC) 100A.

Figure 5:
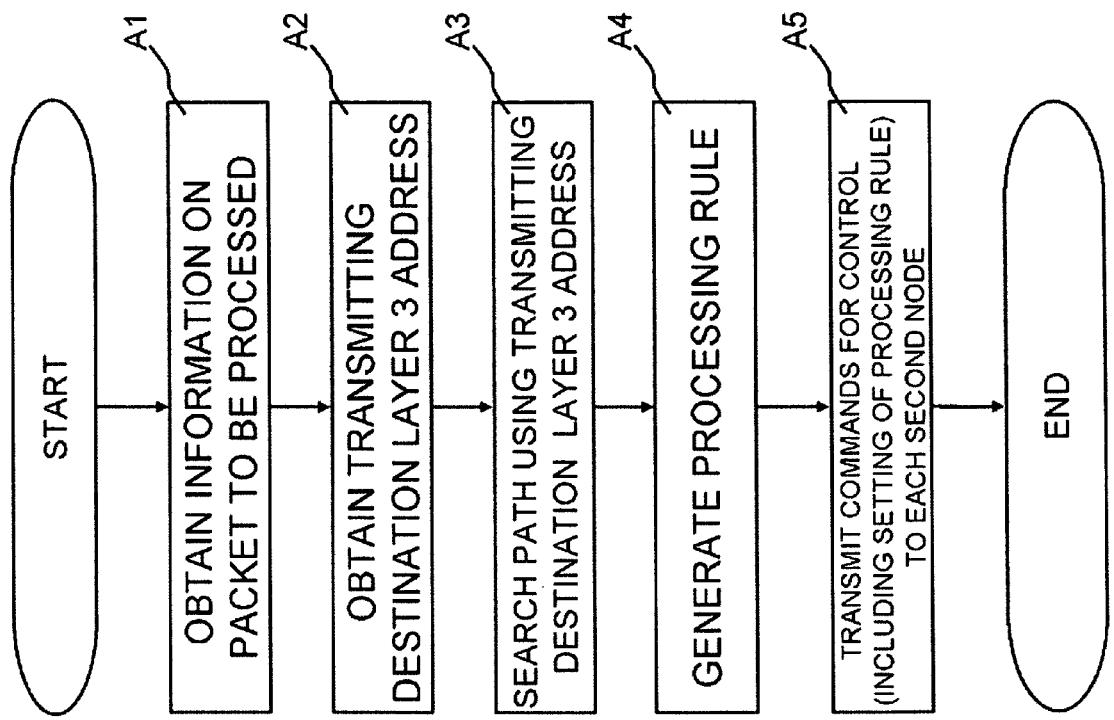
FIG. 5 is a flowchart showing the operation of the first exemplary embodiment of the present invention.

The control apparatus (OFC) 100A that has received the (Packet-in) message requesting the packet handling operation (flow entry) setting executes a series of operations shown in FIG. 5.

Referring to FIG. 5, when the node-communication unit 101 obtains information on the packet to be processed received through the Packet-in message (in step A1), the processing target packet information acquisition unit 103 obtains the transmitting destination layer 3 address (IP address=192, 168.1.4) of the packet to be processed from the node communication unit 101 (in step A2).

Based on the layer 3 destination address (IP address=192, 168.1.4), the path search unit 104 obtains the second node (OFS) 220 that will be the transmitting destination and the flow (matching rule) from the external node position information storage unit 105 to search a path according to the network topology stored in the topology information storage unit 106 (in step A3).

Next, the packet handling operation generation unit 107 refers to the flow identifier management unit 108, generates a flow identifier and an action to be given to the packet belonging to the flow, and then generates a packet handling operation (flow entry) to be set in each of the second nodes (OFSs) 210 and 220 (in step A4).

Finally, the packet control command generation unit 110 transmits to each of the second nodes (OFSs) 210 and 220 the commands for control including setting of the packet handling operation, through the node communication unit 101 (in step A5).

Figure 4:
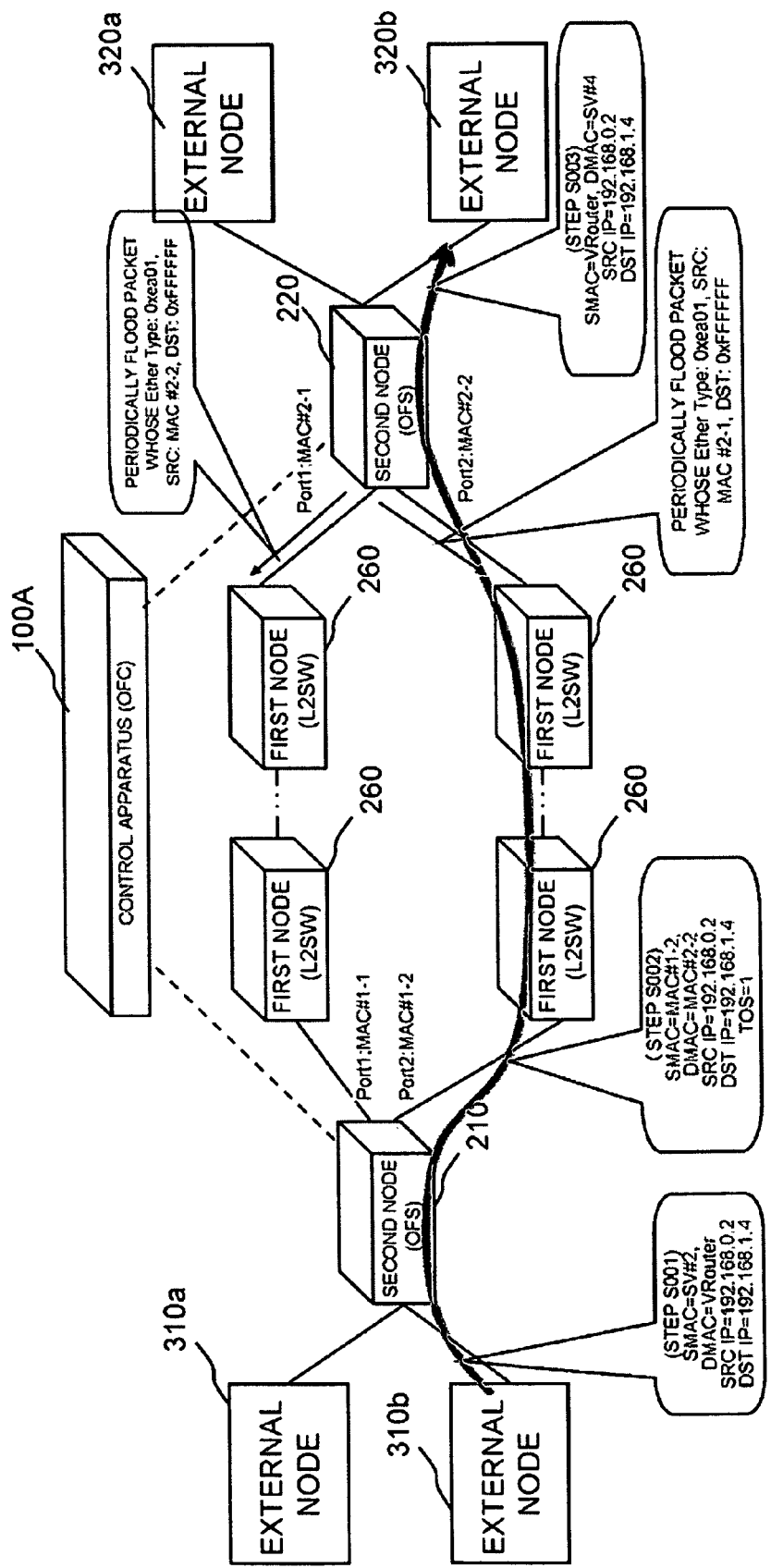
FIG. 4 is a diagram for explaining operation of the first exemplary embodiment of the present invention.

As a result, as shown in step S002 in FIG. 4, the packet handling operation (flow entry) for respectively rewriting the transmission source layer 2 address and the transmitting destination layer 2 address to the layer 2 address (MAC #1-2) of the transmission port of the second node (OFS) 210 and the layer 2 address (MAC #2-2) of the second node (OFS) 220 on the exit side and giving the flow identifier to the IP ToS bits field is set in the second node (OFS) 210.

Further, as shown step S003 in FIG. 4, the packet handling operation (flow entry) for respectively rewriting the transmission source layer 2 address and the transmitting destination layer 2 address to the layer 2 address (VRouter) of the second node (OFS) 220 and the layer 2 address (SV #4) of the external node 320b of a transmitting destination and then outputting the packet according to the flow identifier given to the IP ToS bits field is set in the second node (OFS) 220.

Further, since the control apparatus (OFC) 100A causes the second node (OFS) 220 to periodically flood the learning packet, port information for forwarding the learning packet to the second node (OFS) 220 is learned by the first node 260.

With the above arrangement, forwarding of the packet using the path as shown in a thick arrow line in the lower stage on the page of FIG. 4 is achieved. In this case, a packet to be forwarded using the same path can also be distinguished by a flow identifier given to the packet and a VLAN TAG to be given as necessary.

As described above, according to this exemplary embodiment, even in the network where the first nodes 260 that cannot be directly controlled by the control apparatus (OFC) 100A coexist, a desired path can be set without being constrained by the number of external nodes, and a different flow having the same layer 3 address can be distinguished.

Further, as described above, in this exemplary embodiment, the action of giving or changing the identifier such as the VLAN TAG for identifying a multiplexed network is executed. The network can be thereby multiplexed at the output port of the second node 220 on the exit side.

Figure 6:
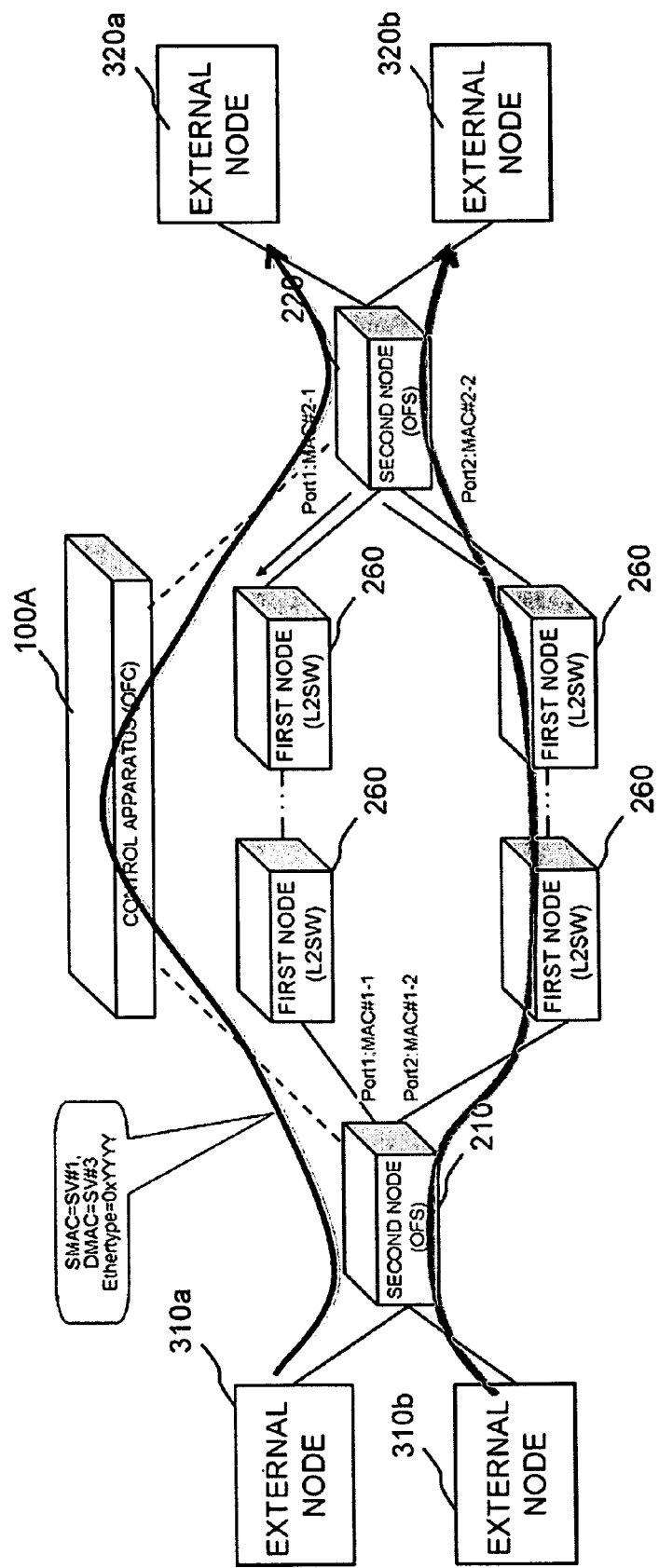
FIG. 6 shows an example of a different packet forwarding path that can be implemented in the first exemplary embodiment of the present invention.

Though omitted in the above-mentioned exemplary embodiment, a packet other than a packet to be processed, e.g., a layer 2 packet other than the IP packet can be forwarded using the Packet-In message and a Packet-Out message for the control apparatus (OFC) 100A, as shown in FIG. 6. With this arrangement, even if the priority of a packet other than a specified packet is set to be low and the packet other than the specified packet is set to be dropped (discarded) at the second nodes 210 and 210, the layer 2 packet can be forwarded.

Though omitted in the above-mentioned exemplary embodiment, electrical conduction between ports of the first nodes 260 may be, of course, regularly checked by unicast.

SECOND EXEMPLARY EMBODIMENT

Figure 7:
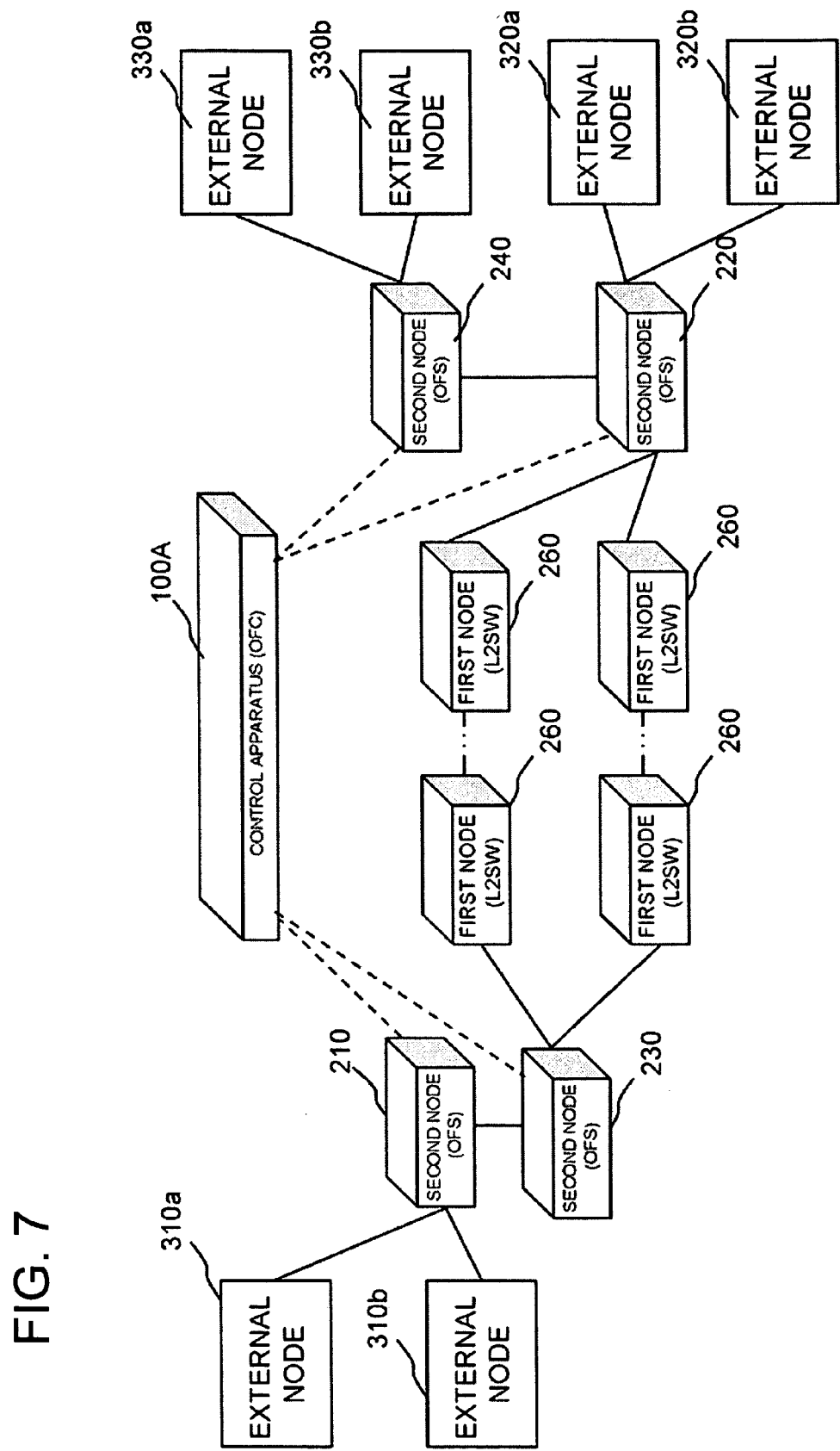
FIG. 7 is a diagram showing an overall configuration of a second exemplary embodiment of the present invention.
Figure 11:
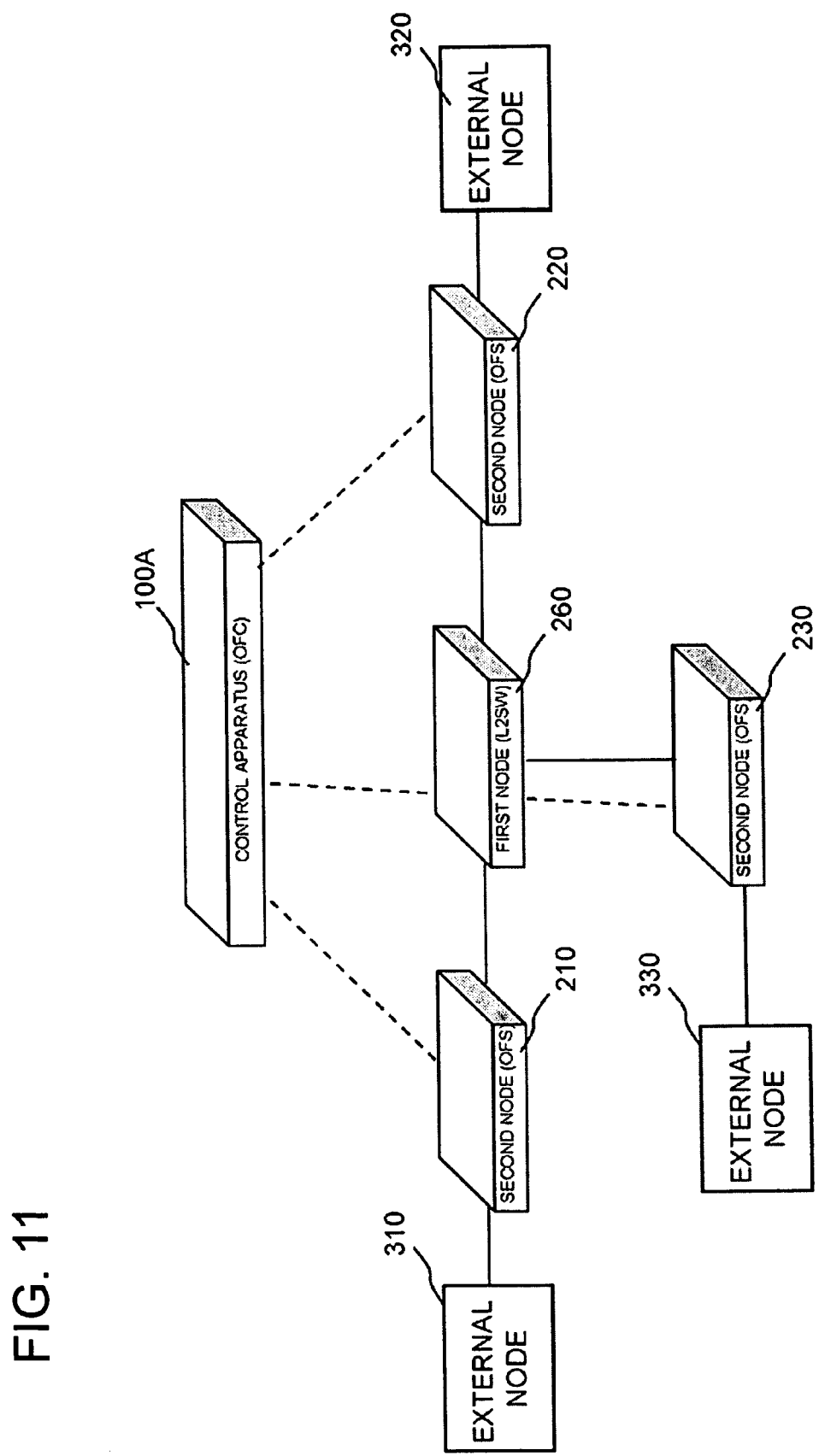
FIG. 11 is a diagram showing a configuration in which a first node and second nodes coexist.

Next, a second exemplary embodiment of the present invention obtained by modifying the first exemplary embodiment will be described. FIG. 7 is a diagram showing an overall configuration of the second exemplary embodiment of the present invention. The second exemplary embodiment is different from the first exemplary embodiment in that a second node (OFS) 230 not connected to any external node is added between a second node (OFS) 210 and a first node(s) (L2SW) 260 and that a second node (OFS) 240 connected to external nodes 330a and 330b is added to a second node (OFS) 220.

Hereinafter, a configuration where the second nodes are directly connected to each other will be referred to as a subdomain. Referring to FIG. 7, the second node (OFS) 210 and the second node (OFS) 230 will be referred to as a subdomain 1, the second node (OFS) 220 and the second node (OFS) 240 will be referred to as a subdomain 2. Then, an entirety including the first nodes between the subdmains 1 and 2 as well as the subdomains 1 and 2 will be referred to as a domain.

A control apparatus 100A in the second exemplary embodiment of the present invention has an approximately same configuration as the control apparatus 100A in the first exemplary embodiment except that a node communication unit 101 is connected to the second nodes (OFS) 210 to 240. Thus, a description will be given, centering on a difference in operation.

The following description will be given, assuming that a path search unit 104 of the control apparatus 100A has searched a path from the second node (OFS) 210 to the second node (OFS) 240 through the second node (OFS) 230, the first nodes (L2SW) 260, and the second node (OFS) 220, for a packet addressed to the external node 330b from an external node 310b.

In this case, a packet handling operation generation unit 107 assigns a unique ID (hereinafter referred to as a flow identifier) capable of uniquely identifying a flow in the subdomain (subdomain 2) to which the second node (OFS) in the final stage of the path (closest to the exit side) belongs. The second exemplary embodiment is different from the first exemplary embodiment in this respect.

A packet control command generation unit 110 generates and transmits control commands to the second node (OFS) 210, the second node (OFS) 230, the second node (OFS) 220, and the second node (OFS) 240 through the node communication unit 101.

Specifically, the packet control command generation unit 110 generates, for the second node (OFS) 210, the command for forwarding the packet to be processed to the second node (OFS) 230. The packet control command generation unit 110 may also generate a command for changing the transmitting destination layer 2 address of the packet to be forwarded to an arbitrary ID for identifying the flow, thereby identifying the flow at the second node within the same subdomain, using the transmitting destination layer 2 address.

The packet control command generation unit 110 generates, for the second node (OFS) 230, the command for modifying the header of the packet to be processed so that the header includes the flow identifier. The packet control command generation unit 110 obtains the layer 2 address of the input port of the second node (second node 220 in FIG. 7) for the first node 260, disposed in the subsequent stage of the first node 260 on the path and then generates the command for changing the transmitting destination layer 2 address of the packet to the obtained layer 2 address. The packet control command generation unit 110 generates the command for specifying the flow (matching rule) at the second node 230.

As in the first exemplary embodiment, a field not to be referred to when the first node 260 forwards the packet is used as the storage field of the flow identifier. In the case of an IP packet, for example, a service type field, an IP option field, or an ID field can be used. When an identifier for multiplexing the network is used at the first node 260, the packet control command generation unit 110 generates a command for giving the identifier for multiplexing.

The packet control command generation unit 110 may read the layer 2 address of the port of the second node 230 connected to the first node 260 from the node information storage unit 109 and then may generate a command for changing the transmission source layer 2 address of the packet to be processed to the layer 2 address of the second node.

The packet control command generation unit 110 generates, for the second node (OFS) 220, the command for forwarding the packet that has been modified at the second node (OFS) 230 and then has been received from the input port of the first node 260 to the second node (second node 240 in FIG. 7) on the exit side according to the flow identifier in the header of the packet. The packet control command generation unit 110 may also generate a command for changing the transmitting destination layer 2 address of the packet to be forwarded to the arbitrary ID for identifying the flow, thereby identifying the flow at the second node within the same subdomain, using the transmitting destination layer 2 address. In this case, the reception destination layer 2 address may be used instead of the transmitting destination layer 2 address. Alternatively, both of the reception destination layer 2 address and the transmitting destination layer 2 address may be combined, for use.

For the second node (OFS) 240, the packet control command generation unit 110 obtains the layer 2 address of the external node associated with the layer 3 address of the transmitting destination from an external node layer 2 address storage unit 111 for the packet that has been modified at the second node (OFS) 230 and then has been received from the second node (OFS) 220. Then, the packet control command generation unit 110 generates the command for changing the transmitting destination layer 2 address of the packet to be processed to the obtained layer 2 address, and generates the command for outputting the packet from the corresponding port of the second node (OFS) 240 according to the flow identifier of the packet to be processed. If necessary, a command for adding the identifier for multiplexing the network to the header is generated, if necessary.

Alternatively, the packet control command generation unit 110 may read the layer 2 address corresponding to the transmission source layer 3 address from the external node layer 2 address storage unit 111, and then may generate a command for changing the transmission source layer 2 address of the packet to be processed to the layer 2 address as read.

As described above, the present invention can be implemented even in the environment where three or more of the second nodes are respectively connected to the external nodes to constitute the subdomains.

In the above-mentioned second exemplary embodiment, the unique ID (hereinafter referred to as the flow identifier) capable of uniquely identifying the flow is assigned in the subdomain (subdomain 2) to which the second node (OFS) in the final stage of the path (closet to the exit side) belongs. However, the flow identifier alone may be assigned or the L2 and L3 addresses and the flow identifier may be combined to be assigned at the first node 260.

The packet control command generation unit 110 generates, for the second node (OFS) 220, the command for forwarding the packet to be processed to the second node (OFS) 240. The packet control command generation unit 110 may also generate the command for changing the destination layer 2 address of the packet to the arbitrary ID for identifying the flow at the second node (OFS) 220, thereby identifying the flow at the second node within the same subdomain, using the destination layer 2 address.

The above description was directed to the preferred exemplary embodiments of the present invention. The present invention is not, however, limited to the exemplary embodiments described above. Further modification, replacement, and adjustment may be added without departing from the basic technical concept of the present invention. In the above-mentioned first exemplary embodiment, for example, the description was given, showing the configuration including two of the second nodes, four of the first nodes, and four of the external nodes. The respective numbers of the second nodes, the first nodes, and the external nodes are not limited to these values.

In each exemplary embodiment described above, the description was given, assuming that each external node is directly connected to the second node. The present invention can also be applied to a configuration in which a first node or a second node belonging to a different network is interposed between the external node and the second node.

In each exemplary embodiment described above, the description was given, assuming that the OpenFlow Switch described in Non Patent Literature 2 is used as the second node. A relay apparatus other than the OpenFlow Switch can also be used if the relay apparatus can identify a specific flow, can rewrite an arbitrary header field, and can execute a packet forwarding process, according to an external command. A configuration can also be adopted where a relay apparatus capable of setting a path and rewriting a packet by specifying an arbitrary packet match condition using the CLI (command line interface) via Telnet.

Modifications and adjustments of the exemplary embodiments are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

Finally, preferred modes of the present invention will be summarized.
<First Mode>
(See the communication system in the first aspect described above)<

SECOND EXEMPLARY EMBODIMENT

The communication system according to the first mode, wherein the control apparatus includes a node information storage unit that stores address information given to each port of the at least one second node connected to the first node(s); and
the control apparatus causes the second node located upstream of the first node(s) to rewrite the address information of the packet header on a destination to the address information of the second node by referring to the node information storage unit.
<Third Mode>
The communication system according to the first or second modes, wherein
the control apparatus includes an external node address storage unit that stores address information of an external node(s) connected to each of the at least one second node; and
the control apparatus causes the second node located on the exit side to change the address information changed by the second node located upstream of the first node(s) to the address information of the external node, by referring to the external node address storage unit.
<Fourth Mode>
The communication system according to any one of the first to third modes, wherein
the control apparatus causes the second node connected to the first node to transmit a learning packet at a predetermined time interval to update the address table of the first node, the learning packet causing the first node to learn the address information of the first node.
<Fifth Mode>
The communication system according to the fourth mode, wherein
the control apparatus causes the second node to transmit a learning packet at a time interval shorter than a time-out period for an entry in the address table held by the first node.
<Sixth Mode>
The communication system according to any one of the first to fifth modes, wherein
the control apparatus causes the second node(s) to give an identifier for multiplexing a network to one of header fields of the packet to be transmitted.
<Seventh Mode>
The communication system according to any one of the first to sixth modes, wherein
the at least one second node is set to discard the received packet when the packet handling operation associated with the received packet cannot be found as a result of matching of the packet received from the first node against the matching rule.
<Eighth Mode>
The communication system according to any one of the first to seventh modes, wherein
the address information is a MAC address (Media Access Control Address), and the first node is a layer 2 switch that forwards the packet by referring to a MAC address table as the address table.
<Ninth Mode>
The communication system according to any one of the first to eighth modes, wherein
the control apparatus at least gives an identifier that is unique in a subdomain where the second nodes are directly connected, as the flow identification information.
<Tenth Mode>
(See the control apparatus in the second aspect described above)
<Eleventh Mode>
(See the communication method in the third aspect described above)
<Twelfth Mode>
(See the program in the fourth aspect described above)

REFERENCE SIGNS LIST 100, 100A control apparatus (OFC)
101 node communication unit
102 setting information acquisition unit
103 processing target packet information acquisition unit
104 path search unit
105 external node position information storage unit
106 topology information storage unit
107 packet handling operation generation unit
108 flow identifier management unit
109 node information storage unit
110 packet control command generation unit
111 external node layer 2 address storage unit
210~240 second node (OFS)
260 first node (L2SW)
310a-330b external node

What is claimed is:
1. A communication system, comprising:
a first node that forwards a received packet by referring to an address table associating a port(s) of an own first node(s) and address information of a node(s) to which the received packet may be forwarded from the port(s);
at least one second node disposed on each of an entry side and an exit side of a packet forwarding path that passes via the first node(s), each of the at least one second node comprising a packet processing unit that processes the received packet according to a packet handling operation associating a process to be applied to the packet and a matching rule for identifying the packet to which the process is to be applied; and
a control apparatus that sets the packet handling operation in each of the second nodes;
the control apparatus comprising:
a path search unit that determines a packet forwarding path, at least one second node located on the exit side of the packet forwarding path, and an output port of the second node located on the exit side of the packet forwarding path in order to transmit the packet belonging to a new flow to a target address, based on a request from the at least one second node located on the entry side; and
a packet control command generation unit, the packet control command generation unit setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded, the packet control command generation unit setting in the second node located on the exit side of the packet forwarding path a packet handling operation for causing the packet with the flow identification information given thereto to be transmitted from the port associated with the flow identification information.

2. The communication system according to claim 1, wherein the control apparatus includes a node information storage unit that stores address information given to each port of the at least one second node connected to the first node(s); and
the control apparatus causes the second node located upstream of the first node(s) to rewrite the address information of the packet header on a destination to the address information of each of the second nodes by referring to the node information storage unit.

3. The communication system according to claim 2, wherein the control apparatus includes an external node address storage unit that stores address information of an external node connected to the at least one second node; and
the control apparatus causes the second node located on the exit side to change the address information changed by the second node located upstream of the first node(s) to the address information of the external node, by referring to the external node address storage unit.

4. The communication system according to claim 1, wherein the control apparatus causes the second node connected to the first node to transmit a learning packet at a predetermined time interval to update the address table of the first node, the learning packet causing the first node to learn the address information of the first node.

5. The communication system according to claim 4, wherein the control apparatus causes the second node to transmit a learning packet at a time interval shorter than a time-out period for each entry in the address table held by the first node.

6. The communication system according to claim 1, wherein the control apparatus causes the second node(s) to give an identifier for multiplexing a network to one of header fields of the packet to be transmitted.

7. The communication system according to claim 1, wherein each of the at least one second node is set to discard the received packet when the packet handling operation associated with the received packet cannot be found as a result of matching of the packet received from the first node against the matching rule.

8. The communication system according to claim 1, wherein the address information comprises a MAC address (Media Access Control Address), and the first node comprises a layer 2 switch that forwards the packet by referring to a MAC address table as the address table.

9. The communication system according to claim 1, wherein the control apparatus at least gives an identifier that is unique in a subdomain where the second nodes are directly connected, as the flow identification information.

10. A control apparatus, connected to a first node(s) that forwards a received packet by referring to an address table associating a port(s) of an own first node(s) and address information of a node(s) to which the received packet may be forwarded from the port(s), and at least one second node disposed on each of an entry side and an exit side of a packet forwarding path that passes via the first node(s), each of the at least one second node comprising a packet processing unit that processes the received packet according to a packet handling operation associating a process to be applied to the packet and a matching rule for identifying the packet to which the process is to be applied, the control apparatus comprising:
 a path search unit that determines a packet forwarding path, one of the at least one second node located on the exit side of the packet forwarding path, and an output port of the second node located on the exit side of the packet forwarding path in order to transmit the packet belonging to a new flow to a target address, based on a request from one of the at least one second node located on the entry side; and
 a packet control command generation unit, the packet control command generation unit setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded, the packet control command generation unit setting in the second node located on the exit side of the packet forwarding path a packet handling operation for causing the packet with the flow identification information given thereto to be transmitted from the port associated with the flow identification information.

11. A communication method by a control apparatus, connected to a first node(s) that forwards a received packet by referring to an address table associating a port(s) of an own first node(s) and address information of a node to which the received packet may be forwarded from the port and at least one second node disposed on each of an entry side and an exit side of a packet forwarding path that passes through the first node, each of the at least one second node comprising a packet processing unit that processes the received packet according to a packet handling operation associating a process to be applied to the packet and a matching rule for identifying the packet to which the process is to be applied, the communication method being for causing the packet to be forwarded from one of the at least one second node on the entry side to one of the at least one second node on the exit side via the first node, the communication method comprising:
 determining a packet forwarding path, the second node located on the exit side of the packet forwarding path, and an output port of the second node located on the exit side of the packet forwarding path in order to transmit the packet belonging to a new flow to a target address, based on a request from the second node located on the entry side;
 setting in one of the at least one second node located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded; and
 setting in the second node located on the exit side of the packet forwarding path a packet handling operation for causing the packet with the flow identification information given thereto to be transmitted from the port associated with the flow identification information.

12. A non-transitory computer-readable storage medium storing a program for a computer comprising a control apparatus connected to a first node(s) that forwards a received packet by referring to an address table associating a port(s) of an own first node and address information of a node(s) to which the received packet may be forwarded from the port and at least one second node disposed on each of an entry side and an exit side of a packet forwarding path that passes through the first node, the at least one second node comprising a packet processing unit that processes the received packet according to a packet handling operation associating a process to be applied to the packet and a matching rule for identifying the packet to which the process is to be applied, the program causing the computer to execute the processes of:
 determining a packet forwarding path, one of the at least one second node, located on the exit side of the packet forwarding path, and an output port of the second node, located on the exit side of the packet forwarding path in order to transmit the packet belonging to a new flow to a target address, based on a request from one of the at least one second node located on the entry side;
 setting in one of the at least one second node, located upstream of the first node on the packet forwarding path a packet handling operation for writing flow identification information associated with the output port in a field of a packet header not to be referred to when the first node forwards the packet and rewriting address information in the packet header such that the packet arrives at the second node on the exit side, and then causing the packet to be forwarded; and
 setting in the second node located on the exit side of the packet forwarding path a packet handling operation for causing the packet with the flow identification information given thereto to be transmitted from the port associated with the flow identification information.

13. The communication system according to claim 2, wherein the control apparatus causes the second node connected to the first node to transmit a learning packet at a predetermined time interval to update the address table of the first node, the learning packet causing the first node to learn the address information of the first node.

14. The communication system according to claim 13, wherein the control apparatus causes the second node to transmit a learning packet at a time interval shorter than a time-out period for each entry in the address table held by the first node.

15. The communication system according to claim 3, wherein the control apparatus causes the second node connected to the first node to transmit a learning packet at a predetermined time interval to update the address table of the first node, the learning packet causing the first node to learn the address information of the first node.

16. The communication system according to claim 15, wherein the control apparatus causes the second node to transmit a learning packet at a time interval shorter than a time-out period for each entry in the address table held by the first node.

17. The communication system according to claim 2, wherein the control apparatus causes the second node(s) to give an identifier for multiplexing a network to one of header fields of the packet to be transmitted.

18. The communication system according to claim 3, wherein the control apparatus causes the second node(s) to give an identifier for multiplexing a network to one of header fields of the packet to be transmitted.

19. The communication system according to claim 4, wherein the control apparatus causes the second node(s) to give an identifier for multiplexing a network to one of header fields of the packet to be transmitted.

20. The communication system according to claim 5, wherein the control apparatus causes the second node(s) to give an identifier for multiplexing a network to one of header fields of the packet to be transmitted.

* * * * *